United States Patent
Liu (10) Patent No.: US 9,805,119 B2
(45) Date of Patent: Oct. 31, 2017

(54) SUBTITLE PROCESSING METHOD, DEVICE AND SYSTEM AND STORAGE MEDIUM

(71) Applicant: TENCENT TECHNOLOGY (SHENZHEN) COMPANY LIMITED, Shenzhen, Guangdong (CN)

(72) Inventor: Gang Liu, Guangdong (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 272 days.

(21) Appl. No.: 14/645,640

(22) Filed: Mar. 12, 2015

(65) Prior Publication Data

US 2015/0186388 A1  Jul. 2, 2015

Related U.S. Application Data

(63) Continuation of application No. PCT/CN2013/081549, filed on Aug. 15, 2013.

(30) Foreign Application Priority Data

Sep. 17, 2012 (CN) .......................... 2012 1 0345580

(51) Int. Cl.
G06F 17/30 (2006.01)
H04N 5/91 (2006.01)
(Continued)

(52) U.S. Cl.
CPC ...... *G06F 17/3082* (2013.01); *G06F 17/3084* (2013.01); *G06F 17/30796* (2013.01);
(Continued)

(58) Field of Classification Search
CPC .......... G06F 17/30796; G06F 17/3082; G06F 17/3084; H04N 21/44008; H04N 21/6582; H04N 21/8352; H04N 5/76; H04N 5/91
See application file for complete search history.

(56) References Cited

U.S. PATENT DOCUMENTS

| | | | | |
|---|---|---|---|---|
| 2004/0216169 A1* | 10/2004 | Fujiwara | .............. | G11B 27/105 725/135 |
| 2012/0102158 A1* | 4/2012 | Ma | ...................... | H04L 65/4015 709/219 |
| 2014/0068687 A1* | 3/2014 | Greenberg | ........... | H04N 7/0884 725/93 |

FOREIGN PATENT DOCUMENTS

| | | |
|---|---|---|
| CN | 1 543 212 | 11/2004 |
| CN | 1 777 943 | 5/2006 |
| | (Continued) | |

OTHER PUBLICATIONS

International Search Report for PCT/CN2013/081549 dated Nov. 28, 2013, five pages.

*Primary Examiner* — Huy T Nguyen
(74) *Attorney, Agent, or Firm* — Knobbe Martens Olson & Bear LLP (57) ABSTRACT

A subtitle processing method, comprising: receiving an identification code of a video the uploaded by a client; searching and finding out whether a subtitle file corresponding to the identification code exists or not in a video subtitle mapping database; if the subtitle file corresponding to the identification code is found, returning the subtitle search result to the client; or if no subtitle file corresponding to the identification code is found, searching for another identification code located in the same aggregation result for the identification code from a video aggregation database; according to the other identification code, searching and
(Continued)

finding out whether a subtitle file corresponding thereto exists or not in the video subtitle mapping database; and returning the subtitle search result to the client. The above-mentioned subtitle processing method can improve the hit rate when searching for subtitle file. In addition, also provided are a subtitle processing device, a subtitle processing system and a storage medium.

10 Claims, 6 Drawing Sheets

(51) Int. Cl.
    *G11B 27/34*     (2006.01)
    *H04N 7/088*     (2006.01)
    *H04N 21/488*     (2011.01)
    *H04N 21/231*     (2011.01)
    *H04N 21/44*     (2011.01)
    *H04N 21/658*     (2011.01)
    *H04N 21/8352*     (2011.01)
    *H04N 5/76*     (2006.01)

(52) U.S. Cl.
    CPC ........ *G06F 17/30864* (2013.01); *G11B 27/34* (2013.01); *H04N 5/91* (2013.01); *H04N 7/0882* (2013.01); *H04N 21/23109* (2013.01); *H04N 21/44008* (2013.01); *H04N 21/4884* (2013.01); *H04N 21/6582* (2013.01); *H04N 21/8352* (2013.01); *H04N 5/76* (2013.01)

(56) References Cited

FOREIGN PATENT DOCUMENTS

| | | |
|---|---|---|
| CN | 1 902 624 | 1/2007 |
| CN | 1 997 115 | 7/2007 |
| CN | 101 452 726 | 6/2009 |
| CN | 101 491 062 | 7/2009 |
| CN | 101 616 181 | 12/2009 |
| WO | WO 03/061285 | 7/2003 |

* cited by examiner

SUBTITLE PROCESSING METHOD, DEVICE AND SYSTEM AND STORAGE MEDIUM

CROSS-REFERENCE TO RELATED APPLICATION

This application claims priority to and is a continuation application of PCT/CN2013/081549, filed on Aug. 15, 2013 and entitled "SUBTITLE PROCESSING METHOD, DEVICE AND SYSTEM AND STORAGE MEDIUM", which claims the benefit of Chinese Patent Application No. 201210345580.9, filed with the Chinese Patent Office on Sep. 17, 2012 and entitled "SUBTITLE PROCESSING METHOD, DEVICE AND SYSTEM", the contents of which are incorporated herein by reference in their entirety.

TECHNICAL FIELD

The present disclosure relates to the field of video playing technologies, and in particular, to a method, device and system for processing a subtitle in playing a video, and a storage medium.

BACKGROUND

With the rapid development of multimedia and network technologies and the maturation of the modern computer technology especially the massive data storage and transmission technologies, videos, which serve as a main type of media, become an indispensable information carrier in living, education, entertainment and so on. A subtitle plays an important role in playing video files, particularly foreign films.

The current predominant video players provide functions of playing a video and matching the video with a subtitle online, but an efficiency of a successful match varies widely, thereby degrading user experience in the subtitle in playing the video. A reason for this problem is that insufficient correspondence relationships between subtitle files and video files are provided for the video player at a client, resulting in a low success rate of playing a video file with a matching subtitle. At present, the matching correspondence relationship between a video file and a subtitle file is usually made manually by an operator, or, the user searches for a subtitle file in a third-party web site through a client for playing a video file, and then manually loads the subtitle file to actually associate the subtitle file with the video file, then the association between the subtitle file and the video file may be reported to the server, thereby enriching the contents of a subtitle database. In the case of a newly presented video files without association, however, a subtitle file matching with the video file cannot be found.

SUMMARY

Therefore, a subtitle processing method, device and system and a storage medium are provided, to effectively improve a success rate of matching a video file with a subtitle file, so that the user may enjoy a more smooth video viewing experience.

The subtitle processing method includes steps of: receiving an identity code of a video file uploaded by a client; retrieving a subtitle file corresponding to the identity code of the video file in a video subtitle mapping database; returning a subtitle search result to the client.

The subtitle processing method includes steps of retrieving a subtitle file corresponding to a currently playing video file in local; uploading an identity code of the video file and an identity code of a subtitle file to the subtitle mapping interface server if a corresponding subtitle file is found.

A subtitle processing system includes a subtitle searching module wherein the subtitle searching module includes an identity code receiving unit configured to receive an identity code of a video file uploaded by a client; a subtitle search unit configured to retrieve in a video subtitle mapping database to determine whether there is a subtitle file corresponding to the identity code of the video file; and a search result returning unit configured to return a subtitle search result to the client.

A subtitle processing device includes a subtitle searching module configured to retrieve in local to determine whether there is a subtitle file corresponding to a currently playing video file and a map uploading module including a first uploading unit configured to upload an identity code of the video file and an identity code of the subtitle file to the subtitle mapping interface server if a corresponding subtitle file is found.

Further, the present disclosure provides a storage medium containing computer-executable instructions wherein the computer-executable instructions are configured to perform a subtitle processing method including steps of receiving an identity code of a video file uploaded by the client; retrieving a subtitle file corresponding to the identity code of the video file in a video subtitle mapping database; and returning a subtitle search result to a client.

In the above subtitle processing method, device and system and the storage medium, the pair bond between a subtitle file and a video file which is confirmed locally is uploaded to a subtitle mapping interface server, thereby enriching map relationships in a video subtitle mapping database and improving a success rate of matching the subtitle file. Further, the video subtitle mapping database is extended by the video cluster analysis, thereby improving the success rate of matching the subtitle file

DETAILED DESCRIPTION OF THE EMBODIMENTS

In order to further illustrate the technical means employed in the present disclosure, specific embodiments, structures, features and functions of the present disclosure will be detailedly described below in conjunction with the accompanying drawings and preferable embodiments.

A first embodiment provides a subtitle processing method which may be performed by an electronic device such as a personal computer, a smart phone, a tablet Personal Computer (PC) which has a function to play a video file.

Figure 1:
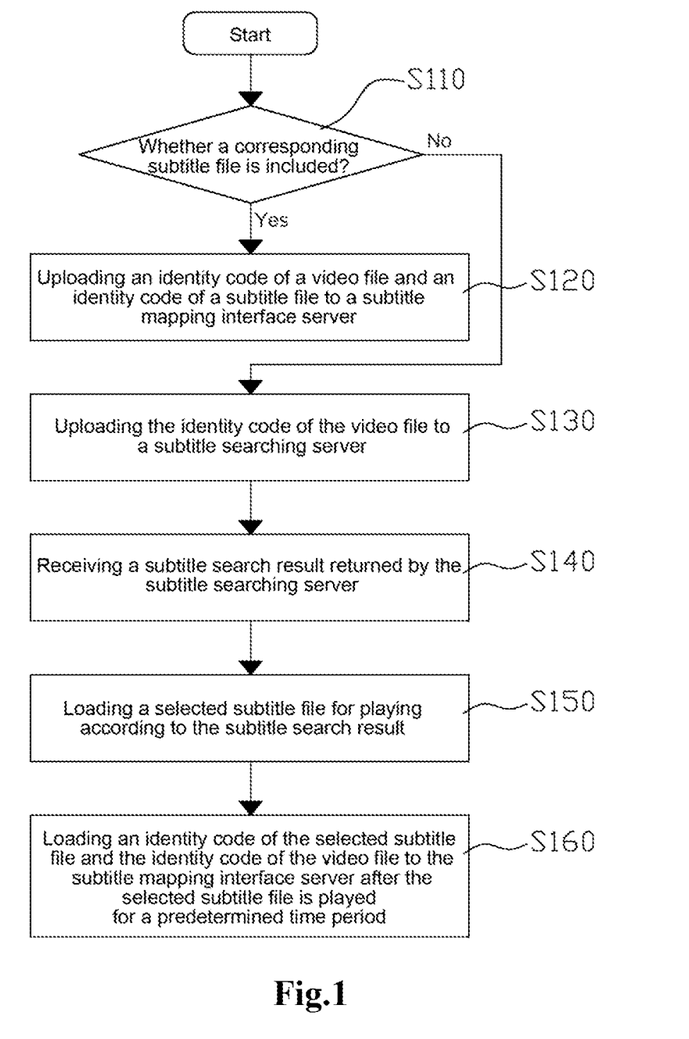
FIG. 1 is a flow chart of a subtitle processing method according to a first embodiment.

As shown in FIG. 1, the above subtitle processing method includes the following steps S110 to S160.

At the step S110, a subtitle file corresponding to a video file being played is searched for in a local device. It shall be understood that the local device herein refers to any of the above various electronic devices. In general, the video file and the subtitle file are downloaded together and located at the same file directory, and the subtitle file has the same file name as the video file but has a file extension different from that of the video file. Therefore, in playing the video file, it is possible to scan the file directory of the video file to determine whether the subtitle file is included in the file directory. Of course, the file name and a path of the subtitle file are not limited to this, instead, the subtitle file may be included in any file directory or have any file name, in this case, the user needs to designate the corresponding subtitle file to be loaded and displayed.

If the corresponding subtitle file is found, then the method proceeds to the step S120, in which an identity code of the video file and an identity code of the subtitle file are uploaded to a subtitle mapping interface server. The identity code of the video file and the identity code of the subtitle file may be for example, a hash code, but the present embodiment is not limited thereto of course, and the identity codes may also be feature codes which are calculated by other algorithms, or the names of the video file and the subtitle file are simply used as the identity codes.

After receiving the identity code of the video file and the identity code of the subtitle file, the subtitle mapping interface server searches for the subtitle file corresponding to the identity code in a subtitle database by using the identity code of the subtitle file so as to determine whether the subtitle file is available. If the subtitle file does not exist in the subtitle database, then a subtitle file uploading request is returned to the electronic device. After receiving the subtitle file uploading request, the electronic device determines whether to upload the subtitle file to the subtitle mapping interface server according to a user setting. For example, the user may choose to upload all subtitle files or none of the subtitle files, or requests for a confirmation on uploading of a subtitle file before the uploading. After receiving the uploaded subtitle file, the subtitle mapping interface server stores the received subtitle file in the subtitle database to enrich the stored contents of the subtitle database.

If a corresponding subtitle file is not found, then the method proceeds to the step S130.

At the step S130, the identity code of the video file is uploaded to a subtitle searching server. The identity code of the video file may be the hash code. After receiving the identity code of the video file, the subtitle searching server searches for a subtitle file corresponding to the identity code of the video file by using the identity code of the video file and accordingly generates a subtitle search result.

Specifically, the subtitle searching server searches a video subtitle mapping database to determine whether a subtitle file corresponding to the identity code of the video file exists in the video subtitle mapping database, and a search result might be that the subtitle file corresponding to the identity code of the video file exists in the video subtitle mapping database, or that one or more subtitle files correspond to the identity code of the video file exist in the video subtitle mapping database. If the subtitle file is found, then a download link for the subtitle file or the subtitle file per se is returned to the electronic device.

If the subtitle file is not found, then other identity codes which are in the same cluster as the identity code of the video file is searched for in a video cluster database. Further, a subtitle file corresponding to each of the other identity codes is searched for in the video subtitle mapping database, and a download link for the found subtitle file or the found subtitle file per se is returned to the electronic device.

At the step S140, the subtitle search result returned by the subtitle searching server is received. The subtitle search result may include the download link for the found subtitle file, and may further include other descriptive Information such as file name and version number. Here, a plurality of subtitle files, which for example correspond to different languages, may be found.

At the step S150, a selected subtitle file is loaded for playing according to the subtitle search result. If only one subtitle file is found, the found subtitle file is played directly. If a plurality of subtitle files are found, the user may select and play one of the subtitle files.

At the step S160, after the selected subtitle file is played for a predetermined time period, an identity code of the selected subtitle file and the identity code of the video file are uploaded to the subtitle mapping interface server. It should be understood that if a certain subtitle file is played for the predetermined time period, it generally means that the subtitle file matches with the video file being played, in this case, a map relationship between the video file and the subtitle file, i.e., a pair bond between the identity code of the video file and the identity code of the subtitle file, is uploaded to the subtitle mapping interface server. After receiving the identity code of the video file and the identity code of the subtitle file, the subtitle mapping interface server may store the same in the video subtitle mapping database to enrich the map relationships in the video subtitle mapping database, for the convenience of subsequent searches.

In the subtitle processing method of the present embodiment, the pair bond between the subtitle file and the video file which has been confirmed locally is uploaded to the subtitle mapping interface server so as to enrich the map relationships in the video subtitle mapping database, thereby improving the success rate of matching a subtitle file.

Figure 2:
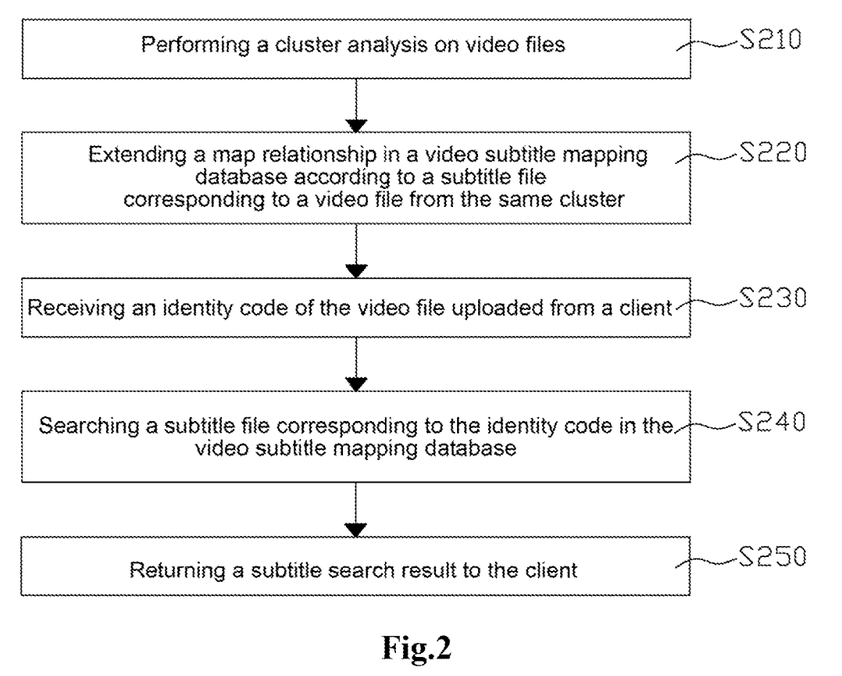
FIG. 2 is a flow chart of a subtitle processing method according to a second embodiment.

A second embodiment provides a subtitle processing method, with reference to FIG. 2, and the method includes the following steps S210 to S250.

At the step S210, a cluster analysis is performed on video files.

The video file here may be from a cloud video storage server, for example, a lot of raw video files will be temporarily stored in the cloud video storage server due to an offline download service, and the cluster analysis on the video files may be performed to enrich the video cluster database. Video segments uploaded by clients form another source of video files, in this case, the cluster analysis is performed according to only partial contents of the video file, but an identity code (such as a hash code) of a complete video file corresponding to the video segment is required to be uploaded simultaneously from the client to the cloud video storage server, to maintain the consistency of search conditions.

Based on the video cluster technology, video files having the same video content are placed in the same cluster, that is, the video files in the same cluster should contain the same video content and may share the same subtitle file.

The cluster analysis result of the video files may be stored in the video cluster database.

At the step S220, a map relationship in the video subtitle mapping database is extended according to a subtitle file corresponding to a video file from the same cluster.

For example, a video file A and a video file B belong to the same cluster after the cluster analysis, the video file A corresponds to a subtitle file C according to the video subtitle mapping database, but a subtitle file corresponding to the video file B does not exist. In this case, the video subtitle mapping database may be updated according to the cluster analysis result so that a correspondence relationship between the video file B and the subtitle file C is established.

At the step S230, an identity code of the video file uploaded from the client is received. The client herein may be the above-described electronic device, for example. When the electronic device is playing the video file, if a subtitle file corresponding to the video file is not found locally, the identity code of the video file is uploaded to the subtitle searching server, and correspondingly the subtitle searching server receives the identity code of the uploaded video file, which corresponds to the step S130.

At the step S240, a subtitle file corresponding to the identity code is searched for in the video subtitle mapping database.

The video subtitle mapping database at least stores the identity code of the video file and the identity code of the corresponding subtitle file, where the identity code of each video file may correspond to the identity codes of a plurality of subtitle files.

If the subtitle file corresponding to the identity code is found, then the method proceeds to the following step S250.

At the step S250, the subtitle file corresponding to the identity code of the video file is included in a subtitle search result, which is then returned to the client.

The subtitle search result may include a download link for the found subtitle file or the found subtitle file per se, and may further include other descriptive information such as file name, version number, and translator or translating organization. If a plurality of subtitle files are found, the subtitle search result may include information of all of the found subtitle files.

In the subtitle processing method of the present embodiment, the video subtitle mapping database is extended by the video cluster analysis, thereby improving the success rate of matching the subtitle file.

Further, it can be understood that the map relationship between the video file and the subtitle file, i.e., the contents of the video subtitle mapping database, is not limited to be extended by the video cluster analysis result.

For example, the contents of the video subtitle mapping database may be updated according to a map relationship between a video file and a subtitle file that is uploaded from the client.

As mentioned in the first embodiment, when the electronic device is playing the video file, if a corresponding subtitle file is found locally in the electronic device, the identity code of the video file and the identity code of the corresponding subtitle file are uploaded to the subtitle mapping interface server, and correspondingly the subtitle mapping interface server receives the identity code of the video file and the identity code of the corresponding subtitle file that are uploaded by the electronic device (i.e. the client).

After receiving the identity code of the video file and the identity code of the corresponding subtitle file, the identity code of the corresponding subtitle file is searched for in the video subtitle mapping database by using the identity code of the video file as a search keyword, to determine whether the identity code of the subtitle file as uploaded is present among identity codes of the subtitle files in the video subtitle mapping database. If the identity code of the subtitle file as uploaded is not present among the identity codes of the subtitle files in the video subtitle mapping database, a record may be newly added or the existing record is amended to include the uploaded identity code of the subtitle file, thus a map relationship between the video file and the subtitle file is newly added in the video subtitle mapping database. Conversely, if the identity code of the subtitle file as uploaded is present among the identity codes of the subtitle files in the video subtitle mapping database, no other operation is performed.

Further, after the identity code of the video file and the identity code of the corresponding subtitle file as uploaded are received, a subtitle file which corresponds to the uploaded identity code of the subtitle file is searched for in a subtitle database.

The subtitle database is configured to store the subtitle file per se and other information relating to the subtitle file, such as the identity code, version number and author information. Here, a corresponding subtitle file is searched for in the subtitle database according to the uploaded identity code of the subtitle file.

If the corresponding subtitle file is not found in the subtitle database, then the method proceeds to the following step of returning a subtitle file uploading request to the client. The subtitle file uploading request may be represented by a predetermined character or character string. After receiving the subtitle file uploading request, the client may determine whether to upload the subtitle file according to a user setting. For example, the user may configure the client in such a way that the subtitle file is uploaded automatically or after user confirmation. Here, the subtitle file is uploaded to the subtitle mapping interface server by the client, and correspondingly the subtitle mapping interface server receives the subtitle file uploaded by the client.

After receiving the uploaded subtitle file, the subtitle mapping interface server stores the received subtitle file in the subtitle database. Thus, the content of the subtitle database is extended by the subtitle file uploaded from the client.

Further, the content of the subtitle database can be enriched by subtitle files actively captured from a network, in addition to the subtitle file uploaded by the client.

The step of actively capturing the subtitle file from a network includes capturing subtitle file information from the network. For example, the content of a web site which publishes subtitles is captured and analyzed to extract the subtitle file information such as the file name and a download link. Then, a subtitle file is downloaded according to the subtitle file information, and the downloaded subtitle file and the subtitle file information is stored in the subtitle database.

Figure 3:
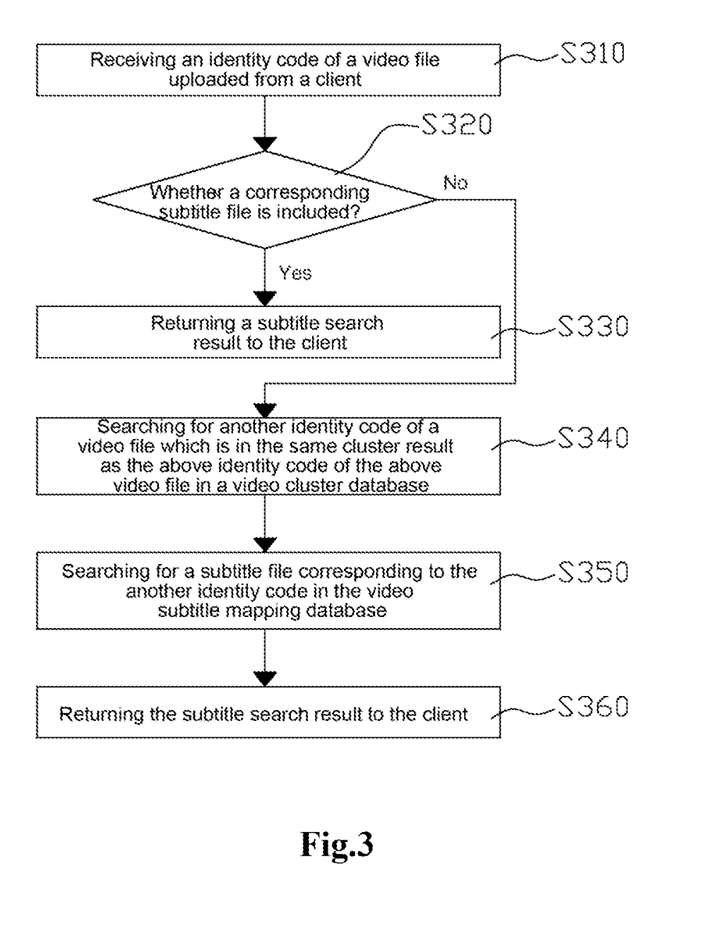
FIG. 3 is a flow chart of a subtitle processing method according to a third embodiment.

A third embodiment provides a subtitle processing method, referring to FIG. 3, and the method includes the following steps S310 to S360.

At the step S310, an identity code of a video file uploaded from a client is received. The client herein may be the above-described electronic device, for example. When the electronic device is playing the video file, if a subtitle file corresponding to the video file is not found locally, the identity code of the video file is uploaded to the subtitle searching server, and correspondingly the subtitle searching server receives the identity code of the uploaded video file, which corresponds to the step S130.

At the step S320, a subtitle file corresponding to the identity code is searched for in the video subtitle mapping database.

The video subtitle mapping database at least stores the identity code of the video file and the identity code of the corresponding subtitle file, where the identity code of each video file may correspond to the identity codes of a plurality of subtitle files.

If the subtitle file corresponding to the identity code of the video file is found, the method then proceeds to the following step S330.

At the step S330, a subtitle search result is returned to the client.

The subtitle search result may include a download link for the found subtitle file or the found subtitle file per se, and may further include other descriptive information such as file name, version number, and translator or translating organization. If a plurality of subtitle files are found, the subtitle search result may include information of all of the found subtitle files.

If the subtitle file corresponding to the identity code of the video file is not found, then the method proceeds to the following step S340.

At the step S340, another identity code of a video file which is in the same cluster as the above identity code of the above video file are searched for in a video cluster database.

The video cluster database is configured to store video cluster results, and one cluster may include a plurality of video files. It can be understood that, in order to search in a video cluster database, the video cluster database shall be created beforehand, that is, before the step S240, the method of the present embodiment may further include: obtaining a cluster result from the cluster analysis of video files, and storing the obtained duster result in the video cluster database.

The video file here may be from a cloud video storage server, for example, a lot of raw video files will be temporarily stored in the cloud video storage server due to an offline download service, and the cluster analysis on the video files may be performed to enrich the video cluster database. Video segments uploaded by clients form another source of video files, in this case, the cluster analysis is performed according to only partial contents of the video file, but an identity code (such as a hash code) of a complete video file corresponding to the video segment is required to be uploaded simultaneously from the client to the cloud video storage server, to maintain the consistency of search conditions.

Based on the video cluster technology, video files having the same video content may be located in the same cluster, that is, the video files in the same cluster should theoretically contain the same video content and may share the same subtitle file.

At the step S350, a subtitle file corresponding to said another identity code is searched for in the video subtitle mapping database.

At the step S350 similar to the step S320, a corresponding subtitle file is searched for in the video subtitle mapping database by using the identity code of each of the video files in the same cluster. It can be understood that one or more subtitle files might be found at this step.

At the step S360, if a subtitle file corresponding to said another identity code is found in the video subtitle mapping database, the found subtitle file corresponding to said another identity code is included in the subtitle search result which is then returned to the client.

The subtitle search result may include a download link for the found subtitle file or the found subtitle file per se, and may further include other descriptive information such as file name, version number, and translator or translating organization. If a plurality of subtitle files are found, the subtitle search result may include information of all of the found subtitle files.

After receiving the subtitle search result, the client may enumerate and display the found subtitle file(s) for selecting by the user, and after the user selects a certain subtitle file, the selected subtitle file is loaded for playing.

In the subtitle processing method of the present embodiment, if the subtitle file corresponding to the video file is not found, then an extended search is conducted by the video cluster analysis result, thereby improving the success rate of matching the subtitle file.

Figure 4:
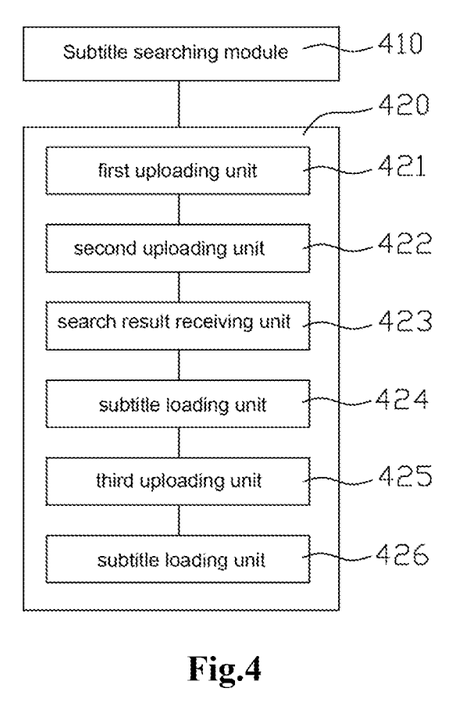
FIG. 4 is a block diagram of a subtitle processing device according to a forth embodiment.

A forth embodiment provides a subtitle processing device, which is operable in an electronic device. Referring to FIG. 4, the subtitle processing device includes: a subtitle searching module 410 and a map uploading module 420.

The subtitle searching module 410 is configured to search for a subtitle file corresponding to a video file being played locally in a local device. In general, the video file and the subtitle file are downloaded together and located at the same file directory, and the subtitle file has the same file name as the video file but has a file extension different from that of the video file. Therefore, in playing the video file, it is possible to scan the file directory of the video file to determine whether the subtitle file is included in the file directory. Of course, the file name and a path of the subtitle file are not limited to this, instead, the subtitle file may be included in any file directory or have any file name.

The map uploading module 420 includes: a first uploading unit 421, a second uploading unit 422, a search result receiving unit 423, a subtitle loading unit 424 and a third uploading unit 425.

The first uploading unit 421 is configured to, if the corresponding subtitle file is found, upload an identity code of the subtitle file and an identity code of the video file to a subtitle mapping interlace server. The identity code of the video file and the identity code of the subtitle file may be for example, a hash code, but the present embodiment is not limited thereto of course, and the identity codes may also be feature codes which are calculated by other algorithms, or the names of the video file and the subtitle file are simply used as the identity codes.

The second uploading unit 422 is configured to upload the identity code of the video file to a subtitle searching server if the corresponding subtitle file is not found. The identity code of the video file may be the hash code. After receiving the identity code of the video file, the subtitle searching server searches for a subtitle file corresponding to the identity code of the video file by using the identity code of the video file and accordingly generates a subtitle search result.

The search result receiving unit 423 is configured to receive a subtitle search result returned by the subtitle searching server. The subtitle search result may include the download link for the found subtitle file, and may further include other descriptive Information such as file name and version number. Here, a plurality of subtitle files, which for example correspond to different languages, may be found.

The subtitle loading unit 424 is configured load a selected subtitle for playing according to the subtitle search result. If only one subtitle file is found, the found subtitle file is played directly. If a plurality of subtitle files are found, the user may select and play one of the subtitle files.

The third uploading unit 425 is configured to upload an identity code of the selected subtitle file and the identity code of the video file to the subtitle mapping interface server after the selected subtitle file is played for a predetermined time period. It should be understood that if a certain subtitle file is played for the predetermined time period, it generally means that the subtitle file matches with the video file being played, in this case, a map relationship between the video file and the subtitle file, i.e., a pair bond between the identity code of the video file and the identity code of the subtitle file, is uploaded to the subtitle mapping interface server.

Further, the map uploading module 420 may also include a subtitle loading unit 426 which is configured to upload the corresponding subtitle file to the subtitle mapping interface server according to a user setting if the corresponding subtitle file is found and a subtitle file uploading request is returned by the subtitle mapping interface server.

More details of the subtitle processing device of the present embodiment may be referenced to the FIG. 1 and the related description.

In the subtitle processing device of the present embodiment, the pair bond between the subtitle file and the video file which has been confirmed locally is uploaded to the subtitle mapping interface server so as to enrich the map relationships in the video subtitle mapping database, thereby improving the success rate of matching a subtitle file.

Figure 5:
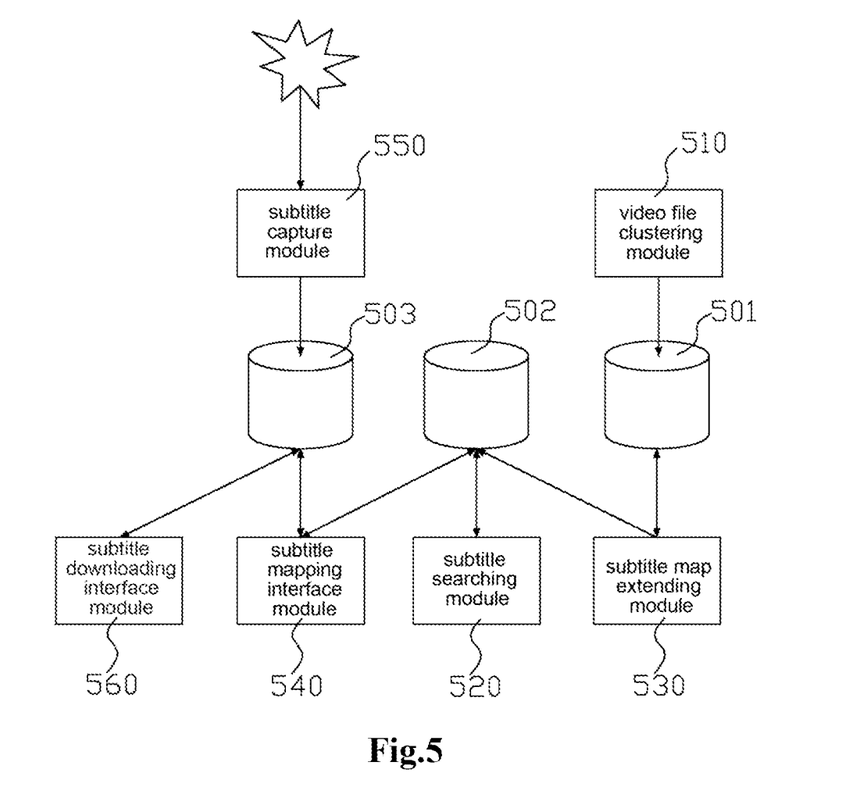
FIG. 5 is a block diagram of a subtitle processing system according to a fifth embodiment.

As shown in FIG. 5, a fifth embodiment provides a subtitle processing system including a video file clustering module 510, a subtitle searching module 520, a subtitle map extending module 530, a subtitle mapping interface module 540, a subtitle capture module 550 and a subtitle downloading interface module 560. Further, the subtitle processing system further includes a video cluster database 501, a video subtitle mapping database 502 and a subtitle database 503. In the present embodiment, the subtitle processing system may be a subtitle searching server.

The video file clustering module 510 is configured to perform a cluster analysis on video files to obtain a cluster result and store the cluster result in the video cluster database 501. The video file here may be from a cloud video storage server, for example, a lot of raw video files will be temporarily stored in the cloud video storage server due to an offline download service, and the cluster analysis on the video files may be performed to enrich the video cluster database. Video segments uploaded by clients form another source of video files, in this case, the cluster analysis is performed according to only partial contents of the video file, but an identity code (such as a hash code) of a complete video file corresponding to the video segment is required to be uploaded simultaneously from the client to the cloud video storage server, to maintain the consistency of search conditions. Based on the video cluster technology, video files having the same video content are placed in the same cluster, that is, the video files in the same cluster should contain the same video content and may share the same subtitle file.

Figure 6:
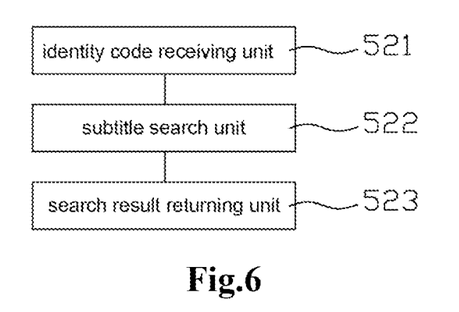
FIG. 6 is a block diagram of a subtitle searching module of a subtitle processing system according to the fifth embodiment.

Referring to FIG. 6, the subtitle searching module 520 includes an identity code receiving unit 521, a subtitle search unit 522 and a search result returning unit 523.

The identity code receiving unit 521 is configured to receive an identity code of a video file uploaded from a client; the subtitle search unit 522 is configured to search for a subtitle file corresponding to the identity code of the video file in a video subtitle mapping database; the search result returning unit 523 is configured to return a subtitle search result to the client if the subtitle file corresponding to the identity code is found.

The subtitle map extending module 530 is configured to extend map relationships of a video subtitle mapping database according to the subtitle files corresponding to the video files in the same cluster. For example, a video file A and a video file B belong to the same cluster after the cluster analysis performed by the video file clustering module 510, the video file A corresponds to a subtitle file C according to the video subtitle mapping database, but a subtitle file corresponding to the video file B does not exist. In this case, the video subtitle mapping database may be updated according to the cluster analysis result so that a correspondence relationship between the video file B and the subtitle file C is established.

The subtitle mapping interface module 540 is configured to receive the identity code of the video file and the identity code of the corresponding subtitle file that are uploaded from the client, and store the received identity code of the video file and the received identity code of the corresponding subtitle files in the video subtitle mapping database.

After receiving the identity code of the video file and the identity code of the corresponding subtitle file, the identity code of the corresponding subtitle file is searched for in the video subtitle mapping database by using the identity code of the video file as a search keyword, to determine whether the identity code of the subtitle file as uploaded is present among identity codes of the subtitle files in the video subtitle mapping database. If the identity code of the subtitle file as uploaded is not present among the identity codes of the subtitle files in the video subtitle mapping database, a record may be newly added or the existing record is amended to include the uploaded identity code of the subtitle file, thus a map relationship between the video file and the subtitle file is newly added in the video subtitle mapping database. Conversely, if the identity code of the subtitle file as uploaded is present among the identity codes of the subtitle files in the video subtitle mapping database, no other operation is performed.

Further, the subtitle mapping interface module 540 is configured to receive the subtitle file uploaded from the client and store the received subtitle file in a subtitle database 503.

The subtitle database 503 is configured to store the subtitle file per se and other information relating to the subtitle file, such as identity code, version number and author information. Here, a corresponding subtitle file is searched for in the subtitle database according to the uploaded identity code of the subtitle file.

After the uploaded identity code of the video file and the identity code of the corresponding subtitle file are received, if the found identity code of the subtitle file does not include the uploaded identity code of the subtitle file, then the method proceeds to the following step of returning a subtitle file uploading request to the client. The subtitle file uploading request may be represented by a predetermined character or character string. After receiving the subtitle file uploading request, the client may determine whether to upload the subtitle file according to a user setting. For example, the user may configure the client in such a way that the subtitle file is uploaded automatically or after user confirmation. Here, the subtitle file is uploaded to the subtitle mapping interface server by the client, and correspondingly the subtitle mapping interface server receives the subtitle file uploaded by the client.

After receiving the uploaded subtitle file, the subtitle mapping interface module 540 stores the uploaded subtitle file in the subtitle database 503. Therefore, the contents of the subtitle database 503 are extended by the upload from the client.

The subtitle capture module 550 is configured to capture the subtitle and relating information from a network, specifically, the content of a web site which publishes subtitles is captured and analyzed to extract the subtitle file information such as the file name and a download link. Then, a subtitle file is downloaded according to the subtitle file information, and the downloaded subtitle file and the subtitle file information is stored in the subtitle database.

The subtitle download interface module 560 is configured to receive a subtitle file downloading request from the client, the contents of the subtitle file are read from the subtitle database 503 and returned the contents of the subtitle file to the client.

It can be understood that the above video file clustering module 510, the subtitle searching module 520, the subtitle map extending module 530, the subtitle mapping interface module 540, the subtitle capture module 550 and a subtitle downloading interface module 560 may be separated serves or one server with different functional modules.

In the subtitle processing system, the subtitle capture module 550 is configured to capture the subtitle from the network and the subtitle mapping interface module 540 is configured to receive the subtitle uploaded from the client or the map relationship between the video file and the subtitle file, thereby enriching the contents of the subtitle database 503 and the video subtitle mapping database 502. Further, the map relationships between the video file and the subtitle file are extended by the subtitle map extending module 530 according to the cluster result of the video files. The subtitle processing system greatly improves the success rate for searching subtitle.

Figure 7:
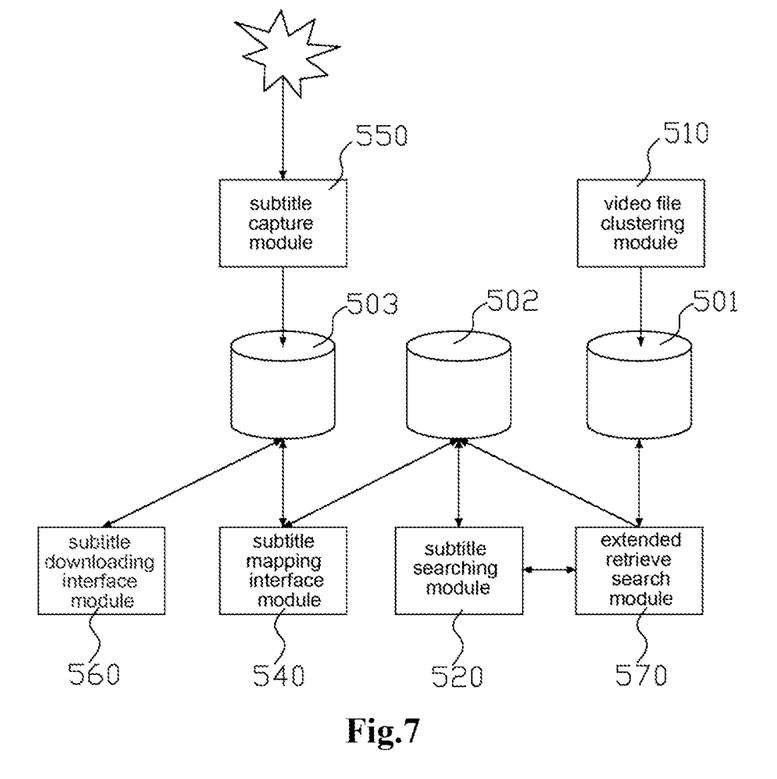
FIG. 7 is a block diagram of a subtitle processing system according to a sixth embodiment.

A sixth embodiment provides a subtitle processing system which is similar to the fifth embodiment. In the present embodiment, the subtitle processing system may be a subtitle searching server. Referring to FIG. 5 and FIG. 7, the sixth embodiment differs from the fifth embodiment in that the subtitle processing system of the present embodiment includes an extended search module 570 instead of the subtitle map extending module 530. If a subtitle file corresponding to an identity code of a uploaded video file is not found in a video subtitle mapping database 502, then an extended search module 570 is invoked.

The extended search module 570 is configured to: search other identity codes in the same cluster as the identity code of the video file of which the subtitle file is requested to be searched from the client; search the subtitle file corresponding to other identity code in the video subtitle mapping database 502; return the search result to a subtitle searching module 520 wherein the subtitle searching module 520 further return the search result to the client.

Compared with the fifth embodiment, the subtitle processing system of the present embodiment does not extend the video subtitle mapping database according to the video file cluster result, but perform and extended search after a specific subtitle search request, thereby improving the success rate of subtitle retrieving.

Further, an embodiment of the present disclosure provides a computer-readable storage medium on which computer-executable instructions are stored, and the computer-readable storage medium may be, for example, a nonvolatile storage such as a Compact Disk (CD), a hard disk or a flash memory. The computer-executable instructions are configured to cause a computer or a similar computing device to perform the various operations of the subtitle processing method.

The above description only shows some preferred embodiments of the present disclosure, rather than limiting the scope of the present disclosure. Despite of the above disclosure of the preferred embodiments, which are not intended to limit the present invention, equivalent embodiments with equivalent modifications or alterations may be made by those skilled in the art in light of the above disclosures without departing from the scope of the present invention. However, the various modifications, equivalent substitutions and improvements made to the embodiments in light of substance of the invention without departing from the disclosures of the invention all fall into the protection scope of the invention.

What is claimed is:

1. A subtitle processing method, comprising:
performing a cluster analysis on a video file;
according to a map relationship between the video file in a cluster and a subtitle file, extending and storing a map relationship of another video file in the same cluster and the subtitle file in a video subtitle mapping database;
receiving an identity code of a video file uploaded by a client;
searching for a subtitle file corresponding to the identity code of the video file in the video subtitle mapping database;
if the subtitle file corresponding to the identity code of the video file is found in the video subtitle mapping database, returning the subtitle file corresponding to the identity code of the video file in a subtitle search result to the client;
if the subtitle file corresponding to the identity code of the video file is not found, searching for another identity code of a video file which is in the same cluster as the identity code of the video file uploaded by the client in the video subtitle mapping database and searching for a subtitle file corresponding to the another identity code in the video subtitle mapping database; and
if the subtitle file corresponding to the another identity code is found in the video subtitle mapping database, returning the subtitle file corresponding to the another identity code through the subtitle search result to the client.

2. The method according to claim 1, further comprising:
updating the video subtitle mapping database according to the identity code of the video file uploaded by the client and an identity code of the subtitle file corresponding to the identity code of the video file.

3. The method according to claim 2, further comprising:
receiving a subtitle file uploaded by the client; and
storing the received subtitle file in a subtitle database.

4. The method according to claim 3, further comprising:
capturing subtitle file information from a network;
downloading a subtitle file according to the subtitle file information; and
storing the downloaded subtitle file and the subtitle file information in a subtitle database.

5. The method according to claim 1, further comprising:
returning the subtitle search result to the client if the subtitle file corresponding to the identity code of the video file uploaded by the client is found.

6. A subtitle processing system comprising a subtitle searching module, wherein the subtitle searching module comprises:

a video file clustering unit configured to perform a cluster analysis on a video file to obtain a cluster result;

a subtitle map extending unit configured to, according to a map relationship between the video file in a cluster and a subtitle file, extend and store a map relationship of another video file in the same cluster and the subtitle file in a video subtitle mapping database;

an identity code receiving unit configured to receive an identity code of a video file uploaded from a client;

a subtitle search unit configured to search for a subtitle file corresponding to the identity code of the video file in the video subtitle mapping database;

a search result returning unit configured to return the subtitle file corresponding to the identity code of the video file in a subtitle search result to the client if the subtitle file corresponding to the identity code of the video file is found in the video subtitle mapping database;

wherein the system further comprises an extended search module which is configured to operate following the subtitle searching module, the extended search module further configured to:

if the subtitle file corresponding to the identity code of the video file is not found, search for another identity code of a video file which is in the same cluster as the identity code of the video file uploaded by the client in the video subtitle mapping database and search for a subtitle file corresponding to the another identity code in the video subtitle mapping database;

return the subtitle file corresponding to the another identity code through the subtitle search result to the client if the subtitle file corresponding to the another identity code is found in the video subtitle mapping database.

7. The system according to claim 6, further comprising a subtitle mapping interface module, which is configured to receive the identity code of the video file and the identity code of the corresponding subtitle file that are uploaded from the client, and store the received identity code of the video file and the received identity code of the corresponding subtitle files in the video subtitle mapping database.

8. The system according to claim 6, wherein, the subtitle mapping interface module is further configured to receive a subtitle file uploaded from the client and store the received subtitle file in a subtitle database.

9. The system according to claim 6, further comprising a subtitle capture module configured to:
 capture subtitle file information from a network;
 download a subtitle file according to the subtitle file information; and
 store the downloaded subtitle file and the subtitle file information in a subtitle database.

10. The system according to claim 6, further comprising a subtitle downloading interface module configured to receive a subtitle file downloading request from the client, wherein, the contents of the subtitle file are read from the subtitle database and returned the contents of the subtitle file to the client.

* * * * *

UNITED STATES PATENT AND TRADEMARK OFFICE
CERTIFICATE OF CORRECTION

PATENT NO. : 9,805,119 B2  
APPLICATION NO. : 14/645640  
DATED : October 31, 2017  
INVENTOR(S) : Gang Liu Page 1 of 1

It is certified that error appears in the above-identified patent and that said Letters Patent is hereby corrected as shown below:

On the Title Page

Item (57), (Abstract) at Line 3, Change "the" to --file--.

In the Specification

In Column 1 at Line 8 (approx.), Change "PCT/CN2013/1081549," to --PCT/CN2013/081549,--.

In the Claims

In Column 12 at Line 52, In Claim 3, change "claim 2," to --claim 1,--.

In Column 12 at Line 55, In Claim 4, change "claim 3," to --claim 1,--.

Signed and Sealed this  
Twenty-eighth Day of May, 2019

Andrei Iancu  
*Director of the United States Patent and Trademark Office*